Oct. 19, 1943.  J. G. LEE ET AL  2,332,465
AERODYNAMIC BRAKE
Filed Aug. 23, 1939  3 Sheets-Sheet 1
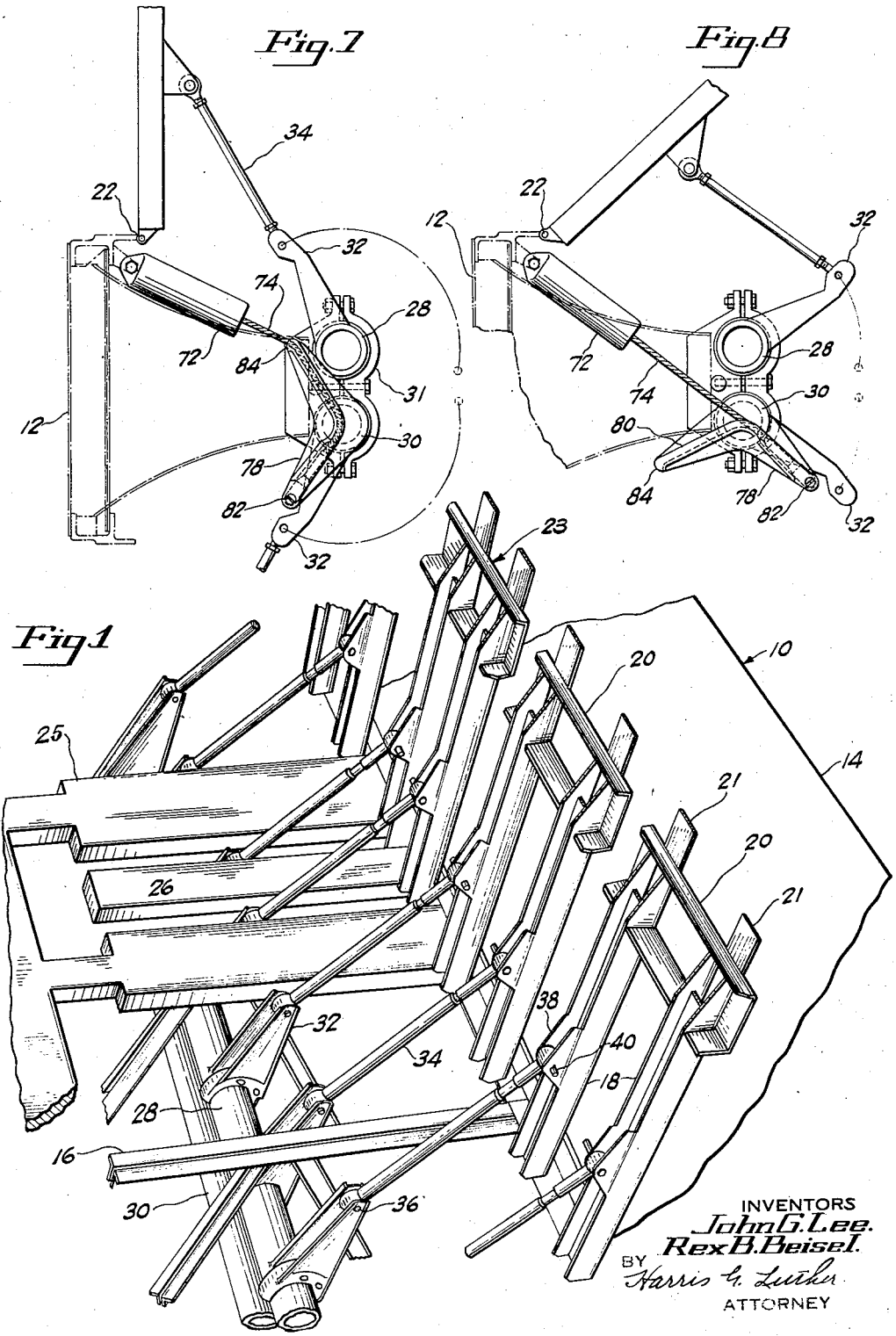
INVENTORS
John G. Lee.
Rex B. Beisel.
BY Harris G. Luther
ATTORNEY

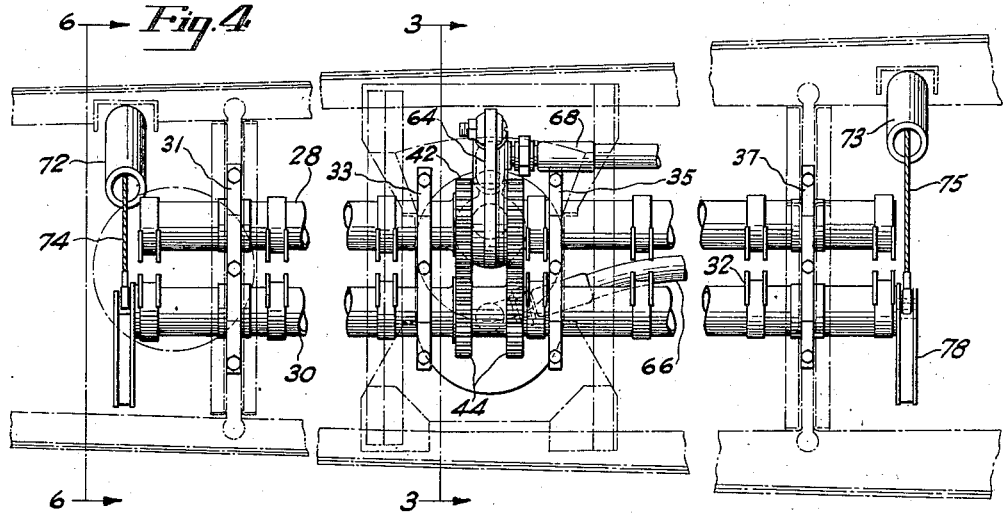
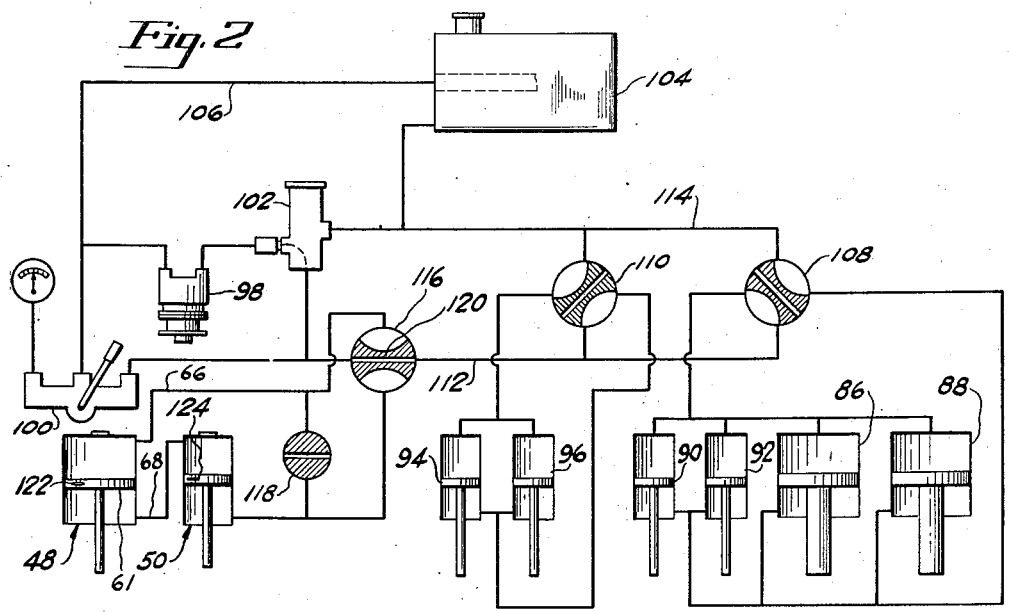

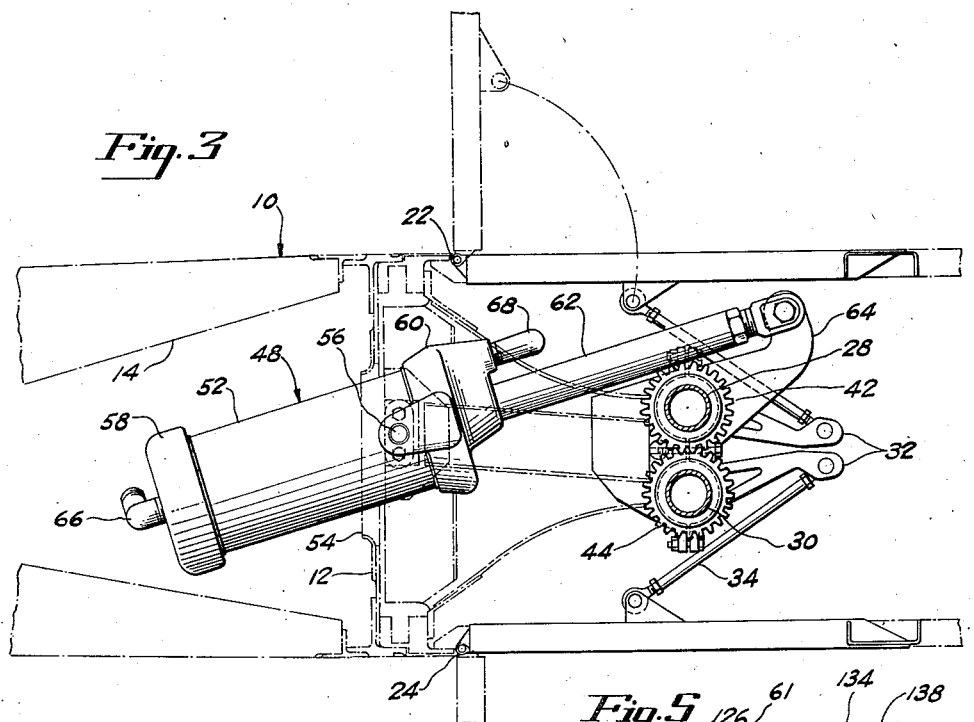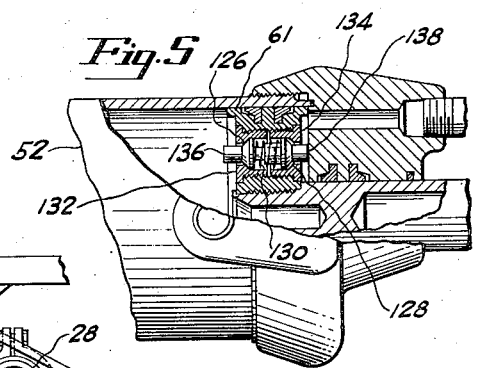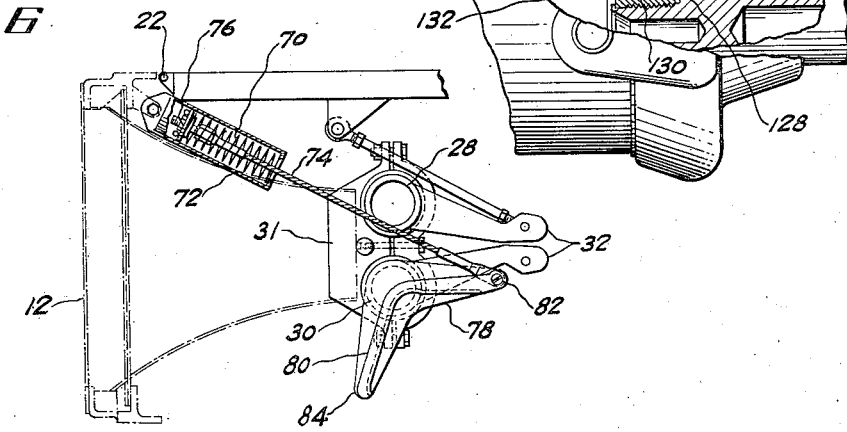

Patented Oct. 19, 1943

2,332,465

UNITED STATES PATENT OFFICE 2,332,465

AERODYNAMIC BRAKE

John G. Lee, Farmington, and Rex B. Beisel, Fairfield, Conn., assignors to United Aircraft Corporation, East Hartford, Conn., a corporation of Delaware Application August 23, 1939, Serial No. 291,534

14 Claims. (Cl. 244—113)

This invention relates to improvements in airplane control devices and has particular reference to an improved means for temporarily increasing the air resistance of an airplane.

An object of the invention resides in the provision of improved means for temporarily increasing the drag or air resistance of an airplane and improved operating mechanism therefor.

A further object resides in the provision of improved resistance increasing devices for increasing the air resistance or drag of an airplane in which said devices are arranged in several groups, and operating mechanism therefor arranged to move said groups substantially in coincidence with each other.

Other objects and advantages will be more particularly pointed out hereinafter or will become apparent as the description proceeds.

In the accompanying drawings, in which like reference numerals are used to designate similar parts throughout, there is illustrated by way of example a suitable mechanical embodiment for the purpose of illustrating the invention. The drawings, however, are for the purpose of illustration only and are not to be taken as limiting the scope of the invention as it will be apparent to those skilled in the art that various changes in the illustrated embodiment may be resorted to without in any way exceeding the scope of the invention.

In the drawings, Fig. 1 is a perspective view of a fragmentary portion of one group of air resistance increasing elements and a portion of the operating mechanism therefor.

Fig. 2 is a diagrammatic illustration of the operating mechanism.

Fig. 3 is a sectional view through a portion of an airplane wing to which the resistance increasing mechanism is applied showing the resistance increasing elements and operating mechanism at the plane of the section.

Fig. 4 is a spanwise sectional view of portions of the airplane wing shown in Fig. 3 showing the operating mechanism in rear elevation.

Fig. 5 is a detail view of a portion of the hydraulic operating mechanism shown in Fig. 3.

Fig. 6 is an end elevational view of the operating mechanism shown in Fig. 3 in one operative position.

Fig. 7 is a view similar to Fig. 6 showing the operating mechanism in a different operative position, and Fig. 8 is a view similar to Figs. 6 and 7 showing the operating mechanism in a still different operative position intermediate the position shown in Figs. 6 and 7.

Referring to the drawings in detail, the numeral 10 generally indicates the airplane wing to which the resistance increasing devices are applied. The resistance increasing members themselves are in the form of flap like structures each including a plurality of individual elements hinged at one end to the wing structure adjacent the surface of the wing. The flap like structures are applied to both wings of an airplane or to both end portions of a continuous wing in a manner to balance the drag induced forces about the spanwise center of the wing and may be applied to both the upper and lower surfaces of the wing, as particularly shown in Fig. 3.

Air resistance increasing means find particular usefulness in limiting the terminal velocity of an airplane during rapid descents such as vertical dives. Because of the excessive air loads that would result on the control and because of the danger of destructive vibration, it is usually considered best not to extend either the lift increasing flaps, or droop the ailerons during such dives.

On the other hand it is usual to extend the lift increasing flap, droop the ailerons and extend the landing gear during landing operations. Extension of the air resistance flaps during landing operations, however, would materially interfere with the control of the airplane and should be avoided. In the following description the relation between the air resistance flaps and other oil operated mechanism as well as the specific construction and operation of the flaps themselves will be explained.

Referring particularly to Fig. 1 the airplane wing is generally indicated by the numeral 10. This wing may be of conventional construction having a covering of suitable fabric or sheet metal secured upon a suitable structural framework. In the form illustrated the wing has a main spar member, as indicated at 12 in Fig. 3, and a unitary leading edge structure 14, secured to the spar member in a manner to stiffen and reinforce the spar member and constitute with the spar member the longitudinal load carrying portion of the wing. Suitable ribs 16 are secured to the rear of the spar member to constitute the frame structure of the rearward portion of the wing. The covering on the rearward portion of the wing terminates somewhat short of the spar member 12 to provide a spanwise gap for the reception of the wing carried drag increasing elements.

The drag increasing elements may each conveniently comprise a plurality of relatively narrow channel members 18 connected together in pairs by transverse channel members 20, all of which channel members may conveniently be formed of sheet metal stampings. If desired the air disturbing effect of these members may be increased by the addition of sheet metal tabs, as indicated at 21. The channel members 18 of each pair are hingedly connected at their ends opposite the transverse channel members 20 to the rearward portion of the spar 12 adjacent the wing surfaces by suitable hinge connections, as indicated at 22 and 24 in Fig. 3. Since the spar 12 is substantially straight the units 23, each including two longitudinal channel members 18 and a transverse connecting channel 20, when hinged to the spar member in the manner illustrated, in which the spaces between each two adjacent channel members 18 are substantially equal, constitute a flap like structure having comparatively large airflow spaces between the individual elements 18 and 20 to provide, when operative, an air resistance element which, while highly effective to increase the air resistance of the airplane, does not create large scale turbulent effects in the air stream flowing past the airplane wing and thus avoids buffeting and other undesirable effects usually produced by members extruded beyond the wing surface. The size of the channel members making up the various openwork units and the spacing of these channel members are carefully designed to maintain the turbulent effect produced in the air stream by these members, when operative as air brakes, below a magnitude which would impose undue stresses on the wing structure or interfere materially with the aerodynamic efficiency and control of the airplane.

The units 23 of each group are movable from a position in which they are flush with the wing surface, as shown in full lines in Fig. 3, to a position in which they extend substantially at right angles to the wing surface, as shown in Fig. 1 and in broken lines in Fig. 3. As explained above, there may conveniently be four groups of units, one group applied to each upper and lower surface of the wing portion upon each side of the airplane fuselage. This arrangement is particularly convenient for single wing airplanes since it provides a balance of drag induced forces both laterally and vertically so that there is no tendency for the airplane to turn or tip when the brake elements are put into operation. It is obvious, however, that such other arrangements may be used as may be desirable or convenient without in any way exceeding the scope of the invention.

The gaps provided in the wing surface for the various groups of units 23, which groups will hereinafter be referred to as air resistance flaps, are bridged by suitable fixed cover elements, as indicated at 25 and 26 in Fig. 1, to fill in the spaces between the various channel members 18 and 20 when the flaps are in their retracted or inoperative position so that when the flaps are retracted a substantially unbroken smooth wing surface is provided over the gap between the wing spar and the edge of the wing cover.

The air resistance flaps are moved between their inoperative or retracted position and their operative or extended position by means of rotatable shafts 28 and 30, which may conveniently be in the form of hollow tubes mounted in bearings 31, 33, 35, 37 secured to the airplane wing structure, and carrying radially projecting arms 32 connected respectively to the individual channel members 18 by pivoted links 34. Each arm may conveniently comprise a pair of spaced lug members apertured at their outer ends to receive pins, as indicated at 36, passing through suitable apertures in the corresponding ends of the respective link members 34, and the channel members 18 may be provided with apertured extensions 38 supporting pins 40 passing through suitable apertures in the corresponding ends of the respective link members. The link members are preferably formed in two parts screw threaded together in order that the length of each link member may be individually adjusted to its particular location to avoid strains and binding effects in the operating mechanism. While each shaft operates but one flap or group of elements 23, where two shafts are provided to simultaneously operate flaps on the upper and lower wing surfaces, these shafts are geared together by suitable gear elements, as indicated at 42 and 44, to insure the simultaneous operation of the upper and lower flaps. From this construction it will be observed that when the shafts 28 and 30 are rotated the arms 32 will be turned about the rotational centers of the respective shafts moving the links 34 to swing the units 23 about their hinged connection with the spar 12. When the respective shaft is rotated in one direction the connected units are moved from their retracted to their extended position and when the shaft is rotated in the opposite direction the units will be returned from the extended to the retracted position. As is particularly shown in Figs. 1 and 7, when the units are in their fully extended position the arms 34 are so located that the centers of the respective pins 40 and 36 are on a line which passes through the rotational axis of the corresponding shaft 28 or 30 so that the forces imposed on the flap unit by the relative wind to which they are exposed are transmitted to the respective shafts substantially in compression of the links 34 and arms 32 without any substantial tendency to rotate the shafts. In other words the arrangement is such that when the flap units are fully extended the shaft arms 32 are on dead center.

In the arrangement illustrated the operating shafts 28 and 30 are rotated by suitable hydraulic motors one of which is generally indicated at 48 in Fig. 3 and both of which are schematically shown at 48 and 50, respectively, in Fig. 2. It will be understood that the motor 48 operates the shafts 28 and 30 on one wing while motor 50 simultaneously operates the corresponding shafts of the wing on the opposite side of the fuselage. Since both motors are similar except for a difference in size which will be explained later, it is believed that a particular description of only one of the motors is sufficient for the purpose of this disclosure. The motor 48, for example, comprises a cylinder 52 which projects through a suitable aperture 54 in the spar 12 and is provided near one end with trunnions 56 which anchor it to the spar in a manner such that it may oscillate about the pivotal center of the mounting. The cylinder is closed at both ends by suitable caps, as indicated at 58 and 60, and includes a reciprocable piston 61, secured to the end of a piston rod 62 the outer end of which is pivotally connected to the free end of a torque arm 64 secured to the shaft 28. Hydraulic fluid connections, 66 and 68 are led respectively to the opposite ends of the cylinder. From this description it will be apparent that when hydraulic fluid under pressure is supplied to the outer end of the cylinder through the connection 66 the shafts 28 and 30 will be rotated in a direction to retract the respective flap elements to which they are connected and, when the connection 66 is connected with a suitable drain and hydraulic fluid is supplied through the connection 68 to the inner end of the cylinder, the shafts will be rotated in a manner to extend the respective air resistance flaps.

While the hydraulic motor will operate the flaps in both directions, it is highly desirable to provide, as a safety factor, means whereby the air pressure on the flaps will be effective to retract the flaps and insure safe landing conditions in the event the hydraulic pressure should fail. Because of the irreversible condition of the operating mechanism including the elements 32 and 34 when the flaps are fully extended the air forces will exert little or no rotational forces on the shafts 28 and 30 when the flaps are in their fully extended position so that if the hydraulic motors should become inoperative, the flaps would remain locked in the extended position unless some means were provided to impose an initial rotational force on the shafts. Such means may conveniently comprise a compression spring 70 supported in a casing 72 pivotally attached at one end to the spar 12, a cable 74 extending from an abutment 76 bearing on the free end of the spring, to a pivotal connection with a cam arm 78 secured on one of the shafts, for example the shaft 30. The cam arm 78 carries an angular cam 80 so constructed that as the shaft 30 is rotated in a direction to extend its associated flap the cable 74 is first tensioned to slightly compress the spring 70 and is then wrapped about the cam which is so shaped that little or no additional tension is imposed on the cable by this wrapping action during the intermediate stages of the flap movement, the distance along the cable from the pivotal connection 82 to the abutment 76 remaining substantially constant, as particularly shown in Fig. 8, until a flap position is reached near the fully extended position of the flap. As the flap approaches the fully extended position the end 84 of the cam 80 opposite the pivotal connection 82 comes in contact with the cable 74 and causes a bend in the cable between the rotational axis of the shaft 30 and the abutment end of the cable. The force of the spring 70 tending to straighten the cable imposes a force on the cam arm 78 which tends to rotate the shaft 30 in a direction to retract the associated air resistance flaps. This force is constant and relatively slight and may be overcome by maintaining an appropriate amount of pressure on the hydraulic fluid admitted to the flap operating motor through the connection 68. Should this hydraulic pressure fail, however, the spring will break the dead center relation of the parts 32 and 34 and bring them to a position in which the air forces acting on the flap will rotate the respective shafts 28 and 30 so that the flaps may be returned by the air forces toward their retracted position. When the flaps approach the retracted position the spring will give the cable a pull sufficient to fully retract them. As is particularly shown in Fig. 4, the above described device may be located at one end of the shaft 30 and duplicated at the opposite end of the shaft if desired as indicated at 73, 75 and 78.

Only one pair of flap actuating shafts has been illustrated as the illustration includes only one set of air resistance flaps. It is to be understood, however, that a similar pair of shafts would be provided to operate the pair of air resistance flaps at the opposite side of the fuselage although continuous shafts for operating pairs of flaps, if found feasible or desirable, would not in any way exceed the scope of the invention.

If the airplane utilizes hydraulic devices for operating other instrumentalities it is highly desirable that the air resistance flaps be actuated from the same source of hydraulic pressure without disadvantageously affecting the operation of the other devices. Fig. 2 schematically illustrates a typical arrangement in which the airplane landing gear retracting devices 86 and 88, the high lift flap motors 94 and 96, the aileron droop motor 90 and the landing gear lock actuating motor 92 are all hydraulically operated. While the above is regarded as a fairly typical arrangement it is included only for the purpose of disclosing one illustrative combination of the air resistance flap operating mechanism with existing hydraulically operating devices and in no way affects the scope of the present invention. The hydraulic fluid under pressure may be supplied from a motor driven pump 98, which may be supplemented by a hand operated pump 100 for emergency operation in event the motor driven pump should become inoperative. The pressure developed by both pumps may be controlled by a suitable pressure relief valve 102 having a drain lead back to a reservoir 104 to which the intake of the pumps are connected by a suitable conduit 106. The landing gear retracting and aileron droop control mechanisms, and the high lift flap mechanism, are controlled by valves 108 and 110 respectively, connected between a fluid pressure line 112 leading from the pump outlets and a drain line 114 leading back to the reservoir 104. The air resistance flap operating motors are controlled by a valve 116 disposed between the pump outlets and the valves 108 and 110. This location of the valve 116 prevents extension of the air resistance flaps because of the blocking of the outlet of the hydraulic motors 48 and 50 by the valves 108 and 110 and the mechanisms they control when the valves 108 and 110 are in the position shown in Fig. 2 in which they place the landing gear and high lift flap in operative position. Such a construction will avoid changing the airflow and increasing the drag of the airplane by extending the air brake flaps when the drag is already increased by extension of the landing gear and lowering of the lift increasing wing flap and thus rendering the airplane dangerously unstable. One of the valves 108, 110 must be in a position in which it connects the lines 112 and 114 to render the valve 116 effective to operate the air resistance flaps. An auxiliary emergency valve 118 may be provided to bypass the valve 116, in case that valve should become inoperative, and connect the opposite ends of the hydraulic motors 48 and 50 in a manner to permit a flow of hydraulic fluid from one end of these motors to the other to render the motors inoperative to maintain the air resistance flaps in extended position and permit these flaps to be retracted by the spring and cam devices described above and the air forces acting on the flaps.

As shown, the hydraulic motor 48 is somewhat larger than the motor 50. This difference in size is just sufficient to render the volume in the lower or rod end of the cylinder of the motor 48 equal to the volume of the space in the upper end of the cylinder of the motor 50 so that fluid displaced from the lower end of motor 48 by movement of the piston of that motor will cause an exactly equal movement of the piston of the motor 50 and, conversely, movements of the piston of the motor 50 upwardly in the cylinder of that motor will cause an exactly equal upward movement of the piston of the motor 48. The motors 48 and 50 are connected in series between the pressure and drain side of the valve 116 and the above described proportions insure that the two motors will always tend to move exactly the same amount to give an equal and simultaneous movement to the flap pairs on opposite sides of the airplane. In the arrangement illustrated, if the rotatable elements 120 of the valve 116 be rotated in a counterclockwise direction the outer ends of the two motors 48 and 50 will be connected with the pump outlet while the inner or rod ends will be connected with drain through the channel 112, provided at least one of the valves 108 or 110 is in neutral position, which will result in a flap retracting movement of the motors. If the movable element 120 be rotated in a clockwise direction the inner or rod ends of the two motors will be connected with the hydraulic fluid under pressure while the outer ends will be connected with the drain channel giving to the motors a flap extending movement provided that one or both of the valves 108 and 110 are in neutral position so that drain fluid may vent through these valves to the reservoir 104 as otherwise the motors 48 and 50 will be blocked and it will not be possible to extend the flaps. If both valves 108 and 110 should be away from their neutral position with the air brake flaps extended, as, for instance, if these valves should be actuated to lower the landing gear and high lift flap after the valve 116 has been returned to neutral but before the air brake flaps had been retracted, the air brake flaps could be rendered substantially ineffective by actuating the valve 118 to hydraulically connect the opposite ends of the cylinders 48 and 50 to permit the air forces to move the air brake flaps toward their retracted position.

In the piston of each of the motors 48 and 50 there is provided a through passage controlled by a floating valve as indicated at 122 and 124, respectively, and particularly illustrated in Fig. 5. Each valve element, as shown in Fig. 5, comprises two valve plungers 126 and 128 having telescopically associated stems and resiliently urged apart by the included compression spring 130 into seating relation with the respective seats formed by the bushings 132 and 134. Each plunger is provided with an extension, as indicated at 136 and 138, respectively, which extensions project beyond the corresponding surfaces of the piston in which the valve is mounted. With this arrangement, when the piston of motor 48 comes to the end of its stroke in either direction, if the piston of motor 50 has not reached the end of its stroke in the same direction, the valve 122 is opened by contact of the corresponding extension 136 or 138 with the adjacent end of the cylinder and fluid will flow through the valve and into the motor 50 until the motor 50 also reaches the end of its stroke. Thus if valve plunger 128 is opened by engagement of extension 138 with the cylinder, as shown in Fig. 5, fluid in the cylinder can flow through piston 61 into connection 68, the plunger 126 being held open by fluid pressure in the cylinder. On the other hand if the piston of motor 50 should reach the end of its stroke first the valve 124 will be opened by contact of the corresponding extension with the end of the cylinder so that fluid may flow from the drain side of motor 48 through 50 and valve 124 to the drain connected with motor 50. The same operation will occur when motor 50 is receiving the pressure fluid and motor 48 is connected with the drain line. Thus, if the motors 48 and 50 get out of step with each other during any part of their operation they will be automatically returned to operational coincidence during the remainder of the operation and there is no possibility of any cumulative divergence which would lead to serious lack of synchronism in the operation of the air resistance flaps.

While a suitable mechanical arrangement has been illustrated and hereinabove described for the purpose of disclosing the invention, it is to be understood that the invention is not limited to the particular arrangement so illustrated and described, but that such changes may be resorted to as come within the scope of the subjoined claims.

Having now described the invention so that others skilled in the art may clearly understand the same, what it is desired to secure by Letters Patent is as follows:

1. An air resistance flap for an airplane comprising, a plurality of independent openwork units hinged individually to said airplane adjacent to the surface thereof in alignment with each other, each comprising a pair of members of greater length than width extending at right angles to the axis of said hinges and at least one member substantially parallel to said hinge axis interconnecting the members of said pair, and a rotatable shaft operatively connecting said units together for simultaneous movements.

2. An air resistance flap for an airplane wing comprising, a plurality of independent openwork units individually hinged to said wing adjacent to the surface thereof in alignment with each other and each formed of a pair of elongated members rigidly connected together by a third member, a manually controlled rotatable shaft in said wing, and link and lever means operatively connecting said units to said shaft for simultaneous movement upon rotation of said shaft.

3. An air resistance flap for an airplane comprising, a plurality of separate openwork units hingedly connected to said airplane adjacent to the surface thereof in alignment with each other, each unit comprising a pair of coextensive side members connected at one end by a cross member and hingedly connected at the open end of said unit to an airplane structural member adjacent to the surface of said airplane, and a rotatable shaft within said airplane operatively connecting said units together for simultaneous movements.

4. In an airplane having an air resistance device movable between an extended and a retracted position, an irreversible mechanism for holding said device in said extended position against the retractive effect of air forces acting on said device, and auxiliary means preloaded by movement of said device from said retarded to said extended position for rendering said mechanism reversible by the retractive effect of air forces acting on said device.

5. In an airplane having an air resistance device movable between an extended and a retracted position, a power actuated motor for moving said device from one of said positions to the other, means irreversible by air forces acting on said device when said device is in said extended position operatively connecting said motor with said device, and auxiliary means for rendering said connecting means reversible by said air forces in the event of a failure of power for said motor to render said air forces effective to move said device toward said retracted position in the event of such power failure.

6. In an airplane having an air resistance device movable between extended and retracted positions, power actuated means for moving said device between said two positions and for locking said device in said extended position against the retracting effect of air forces acting thereon, and auxiliary resilient means operatively associated with said power actuated means and operative upon a failure of power to release said lock and assist said air forces to return said device to said retracted position.

7. Actuating means for an airplane air resistance flap including a plurality of openwork units hinged to an airplane wing structure at the surface of said wing comprising, a shaft rotatably mounted in said wing, arms projecting radially from said shaft, pivoted links connecting said arms with said flap units for moving said units simultaneously about said hinged connections, the location of said shaft with respect to said flap and the length of said arms and said links being such that when said flap is in an operative position the pivot points of said links are in line with the rotational axis of said shaft, and means for applying a force tending to disrupt the aligned condition of said pivot points and said shaft axis to permit air forces acting on said flap to return said flap toward its inoperative position.

8. In combination with an airplane having a spar member, an air resistance flap comprising a plurality of openwork units hingedly attached to said spar at the surface of said wing, a shaft mounted for rotation within said wing and having radially projecting arms thereon, pivoted links connecting said flap units with said arms, means for rotating said shaft to move said flap between an inoperative position in which said units are substantially flush with said wing surface and an operative position in which said units are substantially perpendicular to said wing surface, said shaft being so located with respect to said flap and the lengths of said arms and said links being so proportioned that the pivot points of said links are in alignment with the rotational axis of said shafts when said flap is in said operative position to lock said flap in said operative position against the retracting effect of air forces acting thereon, and means for applying a force tending to disrupt said alignment of said pivot points and said shaft axis to render the air forces effective to move said flap toward its inoperative position comprising a cam arm on said shaft, a spring supported independently of said shaft, and a cable connecting said spring and said cam arm, said cam arm being so shaped that said force is applied only when said flap is in or near its terminal positions.

9. In combination with an airplane wing, air resistance flaps each comprising a plurality of separate openwork units separately hinged to the upper and lower surfaces of said wing, an operating shaft for each flap rotatably mounted in said wing, means operatively connecting said shafts with the separate units of the respective flaps, a double acting hydraulic motor device for imparting rotation to one of said shafts, and gear means interconnecting said shafts for simultaneous rotation to operate said flap together.

10. In combination with an airplane wing, an air resistance flap on each half of said wing, a separate hydraulic motor for actuating each flap between a terminal operative position and a terminal inoperative position, hydraulic means connecting said motors in series whereby movement of the two flaps will be substantially coincident, and hydraulic valve means in each motor operative when the respective motor reaches a limiting position in either direction to provide a fluid passage through said motor, whereby both of said motors may reach their limiting positions.

11. In an airplane having a wing, means for temporarily increasing the drag of said airplane comprising, an upper and a lower flap on each half of said wing, flap operating shafts rotatably mounted in said wing and operatively connected with the respective flaps, a pair of hydraulic motors connected respectively with the flap operating shafts in each half of said wing to rotate said shafts, said motors being connected in series by hydraulic fluid lines, whereby a quantity of hydraulic fluid admitted to one motor will move both motors the same distance in the same direction, each of said motors including a cylinder and piston reciprocable in said cylinder and a valve in said piston arranged to open a fluid passage through the respective piston when the respective motor is in either limiting position to provide a fluid passageway through the piston first to reach its limiting position, whereby fluid will flow to the other motor to move its piston to its corresponding limiting position, and control valve means in said fluid lines in series with said motors and remote therefrom.

12. In an airplane having a retractable landing gear, means for retracting said landing gear, a lift increasing flap and means for actuating said flap, one or more air resistance flaps, operating means for extending and retracting said air resistance flaps, and means including control means for said air resistance flap operating means interconnecting the means for extending and retracting said air resistance flaps and the means for extending and retracting said high lift flap and said landing gear to control the operation of said air resistance flap operating means and render said air resistance flap operating means inoperative to extend said air resistance flaps while the landing gear is extended and said lift increasing flap is in operative position.

13. In an airplane having a retractable landing gear, hydraulically actuated means for retracting said landing gear, a lift increasing flap and hydraulically actuated means for operating said flap, one or more air resistance flaps, hydraulically actuated means for extending and retracting said air resistance flaps, and hydraulic means interconnecting the several hydraulically actuated means and including valves controlling the operation of said several hydraulically actuated means, the valve controlling the hydraulically actuated means for extending and retracting said air resistance flaps being also connected with the hydraulic means for operating said lift increasing flap and said landing gear, whereby the hydraulically actuated means for said air resistance flaps is rendered inoperative to extend said air resistance flaps while the landing gear is extended and said lift increasing flap is in operative position.

14. In an airplane having a retractable landing gear, hydraulically actuated means for retracting said landing gear, a lift increasing flap and hydraulically actuated means for operating said flap, one or more air resistance flaps, hydraulically actuated means for extending and retracting said air resistance flaps, means hydraulically interconnecting the several hydraulically actuated means including a control valve for said air resistance flaps actuating mechanism which directs the discharge from said air resistance flaps actuating mechanism into the feed line for said landing gear and lift increasing flap actuating means, whereby said air resistance flaps actuating mechanism is restrained from extending said air resistance flaps when said landing gear and said lift increasing flap are extended.

JOHN G. LEE.
REX B. BEISEL.